(12) United States Patent
Joalland et al.

(10) Patent No.: US 9,272,770 B2
(45) Date of Patent: Mar. 1, 2016

(54) METHOD AND APPARATUS FOR IMPROVED LATERAL CONTROL OF AN AIRCRAFT ON THE GROUND DURING TAKEOFF

(71) Applicant: AIRBUS OPERATIONS (SAS), Toulouse (FR)

(72) Inventors: Benoit Joalland, Tournefeuille (FR); Martin Delporte, Fonsorbes (FR)

(73) Assignee: Airbus Operations (SAS), Toulouse (FR)

( * ) Notice: Subject to any disclaimer, the term of this patent is extended or adjusted under 35 U.S.C. 154(b) by 324 days.

(21) Appl. No.: 13/790,286

(22) Filed: Mar. 8, 2013

(65) Prior Publication Data
US 2013/0233975 A1 Sep. 12, 2013

(30) Foreign Application Priority Data
Mar. 9, 2012 (FR) ...................... 12 52133

(51) Int. Cl.
*B64C 13/16* (2006.01)
*B64C 9/12* (2006.01)
*G05D 1/00* (2006.01)
*B64C 9/32* (2006.01)

(52) U.S. Cl.
CPC . *B64C 13/16* (2013.01); *B64C 9/12* (2013.01); *B64C 9/323* (2013.01); *G05D 1/0083* (2013.01); *Y02T 50/32* (2013.01)

(58) Field of Classification Search
CPC .......... B64C 9/12; B64C 9/323; B64C 13/16; G05D 1/0204; G05D 1/0816; G05D 1/0833
See application file for complete search history.

(56) References Cited

U.S. PATENT DOCUMENTS

| 5,375,793 | A | * | 12/1994 | Rivron | ...................... B64C 9/12 244/184 |
| 6,241,183 | B1 | * | 6/2001 | Mathieu | .................... B64C 9/12 244/99.11 |
| 6,446,911 | B1 | | 9/2002 | Yount et al. | |
| 2004/0230353 | A1 | * | 11/2004 | Villaume et al. | .................. 701/3 |
| 2005/0065672 | A1 | * | 3/2005 | Chardon et al. | ................... 701/4 |
| 2006/0284022 | A1 | | 12/2006 | Harrigan et al. | |
| 2010/0222946 | A1 | * | 9/2010 | Sauvinet | ........................ 701/15 |

OTHER PUBLICATIONS

French Search Report for FR Application 12 52133, (Dec. 17, 2012), Busto, Mario, 2 pages.

* cited by examiner

*Primary Examiner* — Nicholas McFall
(74) *Attorney, Agent, or Firm* — Nixon & Vanderhye P.C.

(57) ABSTRACT

A method and apparatus for carrying out a symmetric deflection of the spoilers so as to reduce the lift of the aircraft during a takeoff roll thereby improving lateral and directional control on the ground.

24 Claims, 2 Drawing Sheets

METHOD AND APPARATUS FOR IMPROVED LATERAL CONTROL OF AN AIRCRAFT ON THE GROUND DURING TAKEOFF

BACKGROUND OF THE INVENTION

This application claims priority to French Patent Application No. 12 52133 filed Mar. 9, 2012, the entire contents of which are hereby incorporated by reference.

FIELD OF THE INVENTION

The present invention relates to a method and an apparatus for improving the lateral and directional control on the ground of an aircraft rolling on a runway of an airport during a takeoff phase.

DISCUSSION OF PRIOR ART

The present invention applies to the ground movement of an aircraft, in particular of an aircraft, civil or military, for transporting passengers or merchandise, during a takeoff phase, and more particularly during the takeoff run. Moreover, this aircraft is able to be controlled laterally on the ground at least by way of a rudder which is controlled as a function of piloting input generated, preferably, by the actuation of a rudder bar by the pilot of the aircraft.

Although not exclusively, the present invention applies more particularly to an aircraft having a system of electronic flight controls, which in a standard manner makes it possible to pilot the aircraft with the aid of a computer, which acquires in particular the position of a control member actuated by the pilot and translates the position into a control output. This control output and anemometric and inertial measurements of the aircraft are then used by piloting laws to compute appropriate control commands for control surfaces of the aircraft.

Currently, the pilot controls the lateral movements of the aircraft on the ground with the aid of manual piloting devices (for example a steering wheel allowing the steering of the nose wheel of the front landing gear, a handle for controlling the thrust of the engines, brake pedals, a rudder bar), in a desired direction. These piloting devices make it possible to control actuators of the aircraft that are capable of influencing the lateral movements of the aircraft, essentially by way of the steering of the nose wheel (and optionally of the steering of the rear gear) and of the rudder of the fin, and more rarely through asymmetric use of the engines and brakes.

It is known that during ground movements, in particular on a takeoff runway of an airport, when the aircraft speed exceeds a predetermined value, generally 40 knots, the pilot uses the rudder bar to generate his control inputs which are taken into account by a computer for the lateral and directional control of the aircraft. In a standard manner, this pilot control input is translated directly into a command for the rudder, to which can be added a set of feedbacks (via a so-called stability augmentation system) using one or more anemometric or inertial measurements of the aircraft (usually the yaw rate) to increase the stability of the aircraft. The present invention is aimed at improving the effectiveness of the control, through the rudder bar, of the lateral and directional movement of the aircraft on the ground during a takeoff phase.

It is known that the fin and the rudder of the aircraft are sized so as to achieve a compromise between, on the one hand, the control of the aircraft (which requires a large fin), and on the other hand, the drag and the weight (which require a small fin). One of the regulatory requirements which guide this compromise is the control of the aircraft during an "activation situation" (this term used hereinafter for all situations when increased ground control is desired or needed). As appreciated by pilots, there will be a minimum control speed on the ground (termed VMCG for "Velocity Minimum Control Ground"), during the takeoff run when the aircraft can be controlled during any activation situation by using the wheel steering of the aircraft (without significant benefit of the aircraft rudder). If an activation situation occurs (such as an engine failure providing an asymmetric thrust tending to yaw the moving aircraft), the grip of the landing gear and the wheel steering will provide sufficient directional control over the aircraft to maintain it on the runway.

The technical problem to be solved is to be able to improve the lateral control of the aircraft, while continuing to use the rudder bar as sole piloting member so as to reduce the VMCG as much as possible while not requiring the pilot to use differential braking and/or differential thrust in order to maintain control.

SUMMARY OF THE INVENTION

The present invention relates to a method making it possible to improve the lateral and directional control on the ground of an aircraft, in particular of a transport aircraft, which is rolling on a (takeoff) runway of an airport during a takeoff phase.

For this purpose, according to the invention, the method according to which the aircraft is able to be piloted laterally on the ground at least by way of a rudder which is controlled as a function of piloting directives generated, preferably, by the actuation of a rudder bar by a pilot of the aircraft, is noteworthy in that, in an automatic manner:

a) a monitoring is carried out so as to be able to detect an activation situation such as an engine out situation, which exists when at least the aircraft is on the ground during its takeoff run;

b) when such an activation situation is detected, control commands are produced to control, in a symmetric manner, the deflection of spoilers which are arranged in a symmetric manner on the wings of the aircraft; and c) the control commands are applied to means of actuation of the said spoilers so as to obtain a symmetric deflection of the spoilers reducing the lift of the aircraft, increasing the weight on the landing gear and thus improving the grip of the landing gear and the aircraft's lateral and directional control on the ground by the pilots operation of the rudder.

Consequently, the method in accordance with the invention envisages a symmetric deflection of the spoilers during takeoff, so as to reduce the wing generated lift and directly increase the normal contact loads between the aircraft landing gear and the ground. The consequence of the increased contact load is to increase the transverse grip of the landing gear on the runway, and thus the controllability of the aircraft. This method is all the more effective as modern aircraft—on account of their aerodynamic optimization—exhibit high lift under rolling conditions and thus a large increase in the landing gear load when a portion of such lift is reduced. Thus, during an activation situation (such as an engine failure on takeoff) while the aerodynamic load generated by the deflection of the rudder is unaffected, the lateral load generated by the landing gear grip on the runway is increased thereby providing the pilot greater authority for lateral and directional control.

The method in accordance with the invention consequently makes it possible to improve the lateral and directional control on the ground of the aircraft during the takeoff phase, that is to say the control of the aircraft in the direction orthogonal to the direction of rolling along the takeoff runway used, so as in particular to facilitate the following by the aircraft of the centerline of the runway. For its implementation, the present invention uses control surfaces, namely spoilers, already present on the aerofoil but never used during takeoff, thereby making it possible to facilitate this implementation and reduce its cost.

One advantage of the present invention is that it may be carried out in an automatic manner and be transparent to the pilot retains his usual steering practices for manual piloting during ground manoeuvres and takeoff by continuing to use the same piloting members (rudder bar) in the same manner and does not therefore require any adaptation time on the part of the pilot.

Advantageously, in step b), control commands are produced, generating a symmetric deflection of the spoilers exhibiting a predetermined rate of deflection, for example 5° per second, and a likewise predetermined angle of deflection of the spoilers, for example 5° (upwards) with respect to the initial deflection. As will be seen, this provides a substantial increase in lateral control and yet does not unduly increase the aerodynamic drag of the aircraft which would lengthen the takeoff run which may be critical if the activation situation were an engine failure just after the Decision Speed (V1 where the aircraft is fast enough and far enough down the runway to be committed to taking off).

Moreover, in a particular embodiment, advantageously, in step a), to verify that the aircraft is on the ground during the takeoff roll, at least one of the following parameters of the aircraft is monitored:
the depression of the landing gears;
a rate of rotation of the wheels; and
a height with respect to the runway, which is provided by a radio altimeter.

Furthermore, in an advantageous manner, in step a), to verify that the aircraft is carrying out a takeoff run, at least one of the following parameters of the aircraft is monitored:
the position of engine thrust control members;
a spoiler function activation indication; and
a speed.

Furthermore, advantageously, when, during the takeoff roll in step a), an engine out activation situation is detected, step c) is automatically inhibited and the spoilers are automatically returned to their initial position, if the aircraft commences its rotation.

Furthermore, in particular to restrict the implementation of the invention to the specific problematic issue of an out fault, it is possible to add other activation and inhibition conditions specified hereinbelow.

The present invention also relates to an apparatus for improving the lateral and directional control on the ground of an aircraft, in particular of a transport aircraft, rolling on a takeoff runway of an airport during a takeoff phase, the said aircraft being able to be piloted laterally on the ground at least by way of a rudder which is controlled as a function of piloting directives generated, preferably, by the actuation of a rudder bar by a pilot of the aircraft.

According to the invention, the apparatus is noteworthy in that it comprises: monitoring means which carry out a monitoring so as to be able to detect an activation situation, which exists when at least the aircraft is on the ground and is carrying out a takeoff run; first means for producing, when an activation situation is detected, control commands intended to control, in a symmetric manner, the deflection of spoilers which are arranged in a symmetric manner on the wings of the aircraft; and second means for applying the control commands to means for actuating the spoilers so as to obtain a symmetric deflection of the spoilers making it possible to reduce the lift of the aircraft and thus to improve its lateral and directional control on the ground, in conjunction with the lateral piloting carried out at least by way of the rudder.

Advantageously, the first means produces control commands which generate a symmetric deflection of the spoilers exhibiting a predetermined rate of deflection and a likewise predetermined angle of deflection of the spoilers.

In a preferred embodiment, the apparatus further comprises means for automatically inhibiting at least the application of the control commands and automatically returning the spoilers to their initial position when the aircraft commences a rotation on takeoff.

The apparatus in accordance with the invention thus makes it possible to improve the lateral and directional control on the ground of the aircraft during the takeoff phase. In particular, concerning the minimum control speed VMCG type, it is possible to define a lower speed and therefore permit aircraft to take off from shorter runway, for the same characteristics of the aircraft.

The present invention also relates to: a system for lateral piloting of an aircraft, of the type comprising at least one rudder which is controlled as a function of piloting directives generated preferably by the actuation of the rudder bar by a pilot of the aircraft, which is furnished with an apparatus such as that aforementioned; and/or an aircraft, in particular a transport aircraft, which is equipped with such an apparatus or with such a system (for lateral piloting and/or of electric flight controls).

In the application to an aircraft which is furnished with a system of electric flight controls, when the pilot actuates the rudder bar, the system of electric flight controls orders (in a standard manner) the deflection of the rudder, but also the symmetric deflection of the spoilers in accordance with the invention. Thus, for one and the same aerodynamic load generated by the deflection of the rudder, the lateral load generated by the reaction of the ground is increased, thus affording the pilot greater authority of lateral and directional control of the aircraft.

BRIEF DESCRIPTION OF THE DRAWINGS

The figures of the attached drawings will explain the manner in which the invention may be implemented and identical reference numbers designate similar elements, in which.

DETAILED DISCUSSION OF EMBODIMENTS

Figure 1:
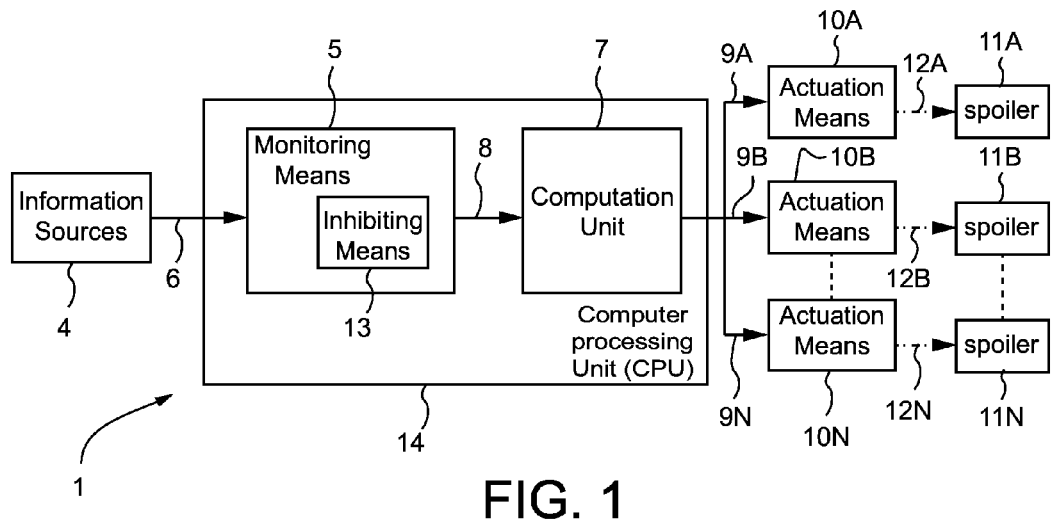
FIG. 1 is the schematic diagram of an apparatus in accordance with the invention in a basic embodiment.

The apparatus 1 in accordance with the invention and represented schematically in FIG. 1 is intended to improve the lateral and directional control on the ground of an aircraft, not represented, when it is rolling on a takeoff runway of an airport during a takeoff phase. This aircraft may be, in particular, a civil or military aircraft, for transporting passengers and/or merchandise. The aircraft is able to be piloted laterally on the ground at least by way of a rudder 2 which is controlled as a function of piloting directives generated, preferably, by the actuation of a rudder bar 3 by a pilot of the aircraft, as specified hereinbelow with reference to FIG. 2.

According to the invention, the apparatus 1 is onboard the aircraft and comprises, as represented in FIG. 1:

an assembly 4 of information sources, which comprises, in particular, means for measuring the current values of parameters of the aircraft;

monitoring means 5 which are connected by way of a link 6 to the assembly 4 and which are configured to carry out automatic monitoring so as to be able to detect an activation situation, which exists when at least the aircraft is on the ground and on a takeoff run;

a computation unit 7 which is connected by way of a link 8 to the monitoring means 5 and which is formed so as to automatically produce, when an activation situation is detected by the monitoring means 5, control commands which control, in a symmetric manner, the deflection of standard spoilers 11A, 11B, . . . , 11N, N being an integer greater than or equal to 2, which are arranged in a symmetric manner on the wings (not represented) of the aircraft; and links 9A to 9N for applying, automatically, the control commands generated by the computation unit 7 to standard actuation means 10A to 10N of the said spoilers 11A to 11N, as illustrated by chain-dotted arrows 12A to 12N, so as to obtain a symmetric deflection of the spoilers 11A to 11N making it possible to reduce the lift of the aircraft and thus to improve its lateral and directional control on the ground, in conjunction with the lateral piloting (specified hereinbelow) which is carried out at least by way of the rudder 2.

Preferably, the monitoring means 5 and the said computation unit 7 form part of a computer processing unit (CPU) 14. Within the framework of the present invention, the deflection of the spoilers implemented in accordance with the invention may relate to all of the spoilers present on the aircraft or just some of them. However, the deflection in accordance with the invention is applied to the same number of spoilers on each of the two wings of the aircraft, and moreover, to spoilers which are arranged in a symmetric manner with respect to the vertical plane passing through the longitudinal axis of the aircraft. Additionally, the deflection of the spoilers is carried out in a symmetric manner, this signifying that the deflection of two symmetrically arranged spoilers is carried out at the same rate of deflection and with one and the same angle of end of deflection. Preferably, all the spoilers controlled in accordance with the invention are deflected at the same rate of deflection and with one and the same angle of end of deflection.

The apparatus 1, in accordance with the present invention, carries out a symmetric deflection of the spoilers 11A and 11N during takeoff, so as to directly increase the normal contact loads between the aircraft and the ground, the indirect effect of which is to increase the transverse contact loads, and thus the controllability of the aircraft. The apparatus 1 is all the more effective as modern aircraft—on account of their aerodynamic optimization—exhibit high lift under rolling conditions and thus the deployment of the spoilers will greatly reduce the high lift and increase the load on and the grip of the landing gear tires.

The apparatus 1 in accordance with the invention consequently makes it possible to improve the lateral and directional control on the ground of the aircraft during the takeoff phase, that is to say the control of the aircraft in the direction orthogonal to the direction of rolling along the takeoff runway used, so as in particular to facilitate the following by the aircraft of the centre line of the runway.

For its implementation, the apparatus 1 therefore uses spoilers 11A to 11N already present on the airfoil, but never used in this manner (during takeoff), thereby making it possible to implement and reduce the cost of implementation.

Moreover, the implementation of the invention, which is carried out in an automatic manner by the apparatus 1, is transparent to the pilot who can retain his usual practices for manual piloting during ground manoeuvres by continuing to use the same piloting members in the same manner and does not therefore require any additional training on his part.

The apparatus 1 in accordance with the invention thus makes it possible to improve the lateral and directional control on the ground of the aircraft during the takeoff phase. In particular, concerning the minimum control speed (on the ground) VMCG, it is possible, by virtue of the invention, to define a lower speed, and therefore to enable take off from a shorter runway for the same aircraft.

The computation unit 7 is formed so as to produce control commands which generate a deflection (of the spoilers 11A to 11N) which exhibit: a predetermined rate of deflection; and a final angle of deflection of the spoilers 11A to 11N (with respect to the position of the spoilers prior to the action of the apparatus 1) which is likewise predetermined.

It is known that the symmetric deflection of the spoilers 11A to 11N generates negative lift and drag. It should also be noted: that a significant deflection of the control surfaces of the aerofoil disturbs the aerodynamic flow downstream of the aerofoil, and can negatively affect the effectiveness of the control surfaces situated on the empennage; and that the fast deflection of the rudder 2 up to its end stop remains the priority, and that the hydraulic pressure necessary for this movement must always be available. As a result, the deflection of a certain number of spoilers 11A to 11N occurring at the same time as that of the rudder 2 must not create a demand exceeding the capabilities of the hydraulic systems of the aircraft. Suitable kinematics (maximum rate of controlled swing and deflection) is therefore chosen.

Figure 3:
FIG. 3 is a graphic illustration of the aerodynamic effect of the deflection of spoilers on the drag.

In FIG. 3, a curve C1 illustrating the aerodynamic effect of the deflection of the spoilers 11A to 11N on the drag. This FIG. 3 presents as the abscissa, the angle of deflection (AB) of the spoilers (expressed in degrees) and as the ordinate, the E1 (dimensionless) drag coefficient.

Figure 4:
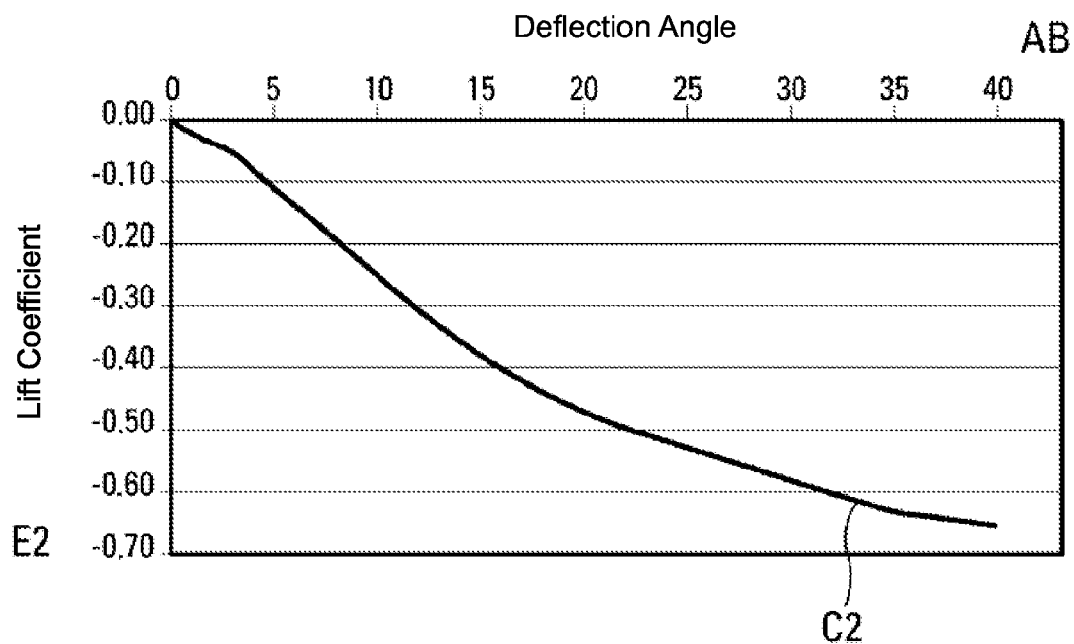
FIG. 4 is a graphic illustration of the aerodynamic effect of the deflection of spoilers on the lift.

In FIG. 4, a curve C2 illustrating the aerodynamic effect of the deflection of the spoilers 11A to 11N on the lift. This FIG. 4 presents as an abscissa the angle of deflection (AB) of the spoilers (expressed in degrees) and as an ordinate the E2 (dimensionless) lift coefficient.

Thus, it will be noted for a typical large aircraft, a spoiler deflections of 10° or less, there is a reduction of 0.2 (0.0 $C_L$-0.2 $C_L$) in the lift coefficient without generating any appreciable increase in the drag coefficient (0.0 $C_D$-0.015 $C_D$). Accordingly, a preferred embodiment providing a deflection of 5° (upwards) for all the spoilers 11A to 11N, with respect to their initial position optimizing the configuration would provide a substantial reduction in lift without adversely affecting the aerodynamic drag.

Furthermore, in a preferred embodiment, the controlled rate of swing is chosen equal to 5°/s (5 degrees per second) which is compatible with the response time sought so as to counter an activation situation (such as an engine out) during the takeoff run, without constituting a prohibitive demand for the hydraulic systems.

Moreover, as indicated above, to implement the invention, the monitoring means 5 verifies that the aircraft is on the ground and that it is in the process of its takeoff run during a takeoff phase. This is needed because during the landing, the spoiler function already fulfils its normal role and, during normal taxiing, the lift of the aircraft is negligible, and consequently the deflection of the spoilers is needless, in addition to being ineffective.

In a particular embodiment, to verify that the aircraft is indeed on the ground, the means 5 monitors that at least one of the following conditions is fulfilled on the aircraft: the landing gear of the aircraft are depressed, this item of information being received from standard means forming part of the information sources 4; the measurement of the rate of rotation of the wheels (received from standard means likewise forming part of the information sources 4) complies with ground rolling; and the measurement of the height with respect to the runway, which is provided by a radio altimeter (forming part of the information sources 4), is less than a predetermined value.

Furthermore, to verify that the aircraft is indeed carrying out a takeoff run, the means 5 monitors at least one of the following parameters (received from standard means forming part of the information sources 4) of the aircraft: the position of engine thrust control members (so as to be able to differentiate the phases of taxiing, takeoff, interrupted takeoff and landing); a spoiler function activation indication (so as to be able to differentiate the phases of takeoff, interrupted takeoff, and landing); and a measurement of the speed of the aircraft with respect to the air or to the ground, which must be greater than a predetermined value (so as to be able to differentiate the phases of taxiing and takeoff).

Furthermore, in a particular embodiment, the means 5 may detect an activation situation, when, in addition to the previous conditions, there may be a need to increase the controllability of the aircraft (when the existing control authority is reaching a limit). To perform this detection, the means 5 can use, for example, at least one of the following measurements carried out by standard means (of the information sources 4): a measurement of the proximity of the rudder bar 3 with respect to its end stop; and a measurement of the proximity of the rudder 2 with respect to its end stop.

The negative lift generated by the spoilers must not impede lift-off of the aircraft during its takeoff, and it is therefore necessary to return the spoilers 11A to 11N to their initial (stowed) position so as to regain the aerodynamic configuration of the aerofoil optimizing the takeoff performance. In a preferred embodiment, the apparatus 1 comprises means 13 (which form for example part of the means 5) for inhibiting in an automatic manner the functions implemented by the invention and in particular the application of the spoilers deflection commands and automatically returning the spoilers to their initial position, when the aircraft commences rotation during the takeoff run.

The detection of the rotation on takeoff situation can occur, for example, when at least one of the following conditions is fulfilled: a measurement of attitude of the aircraft is greater than a predetermined value; and the position of a longitudinal piloting input (such as the pilot pulling back on the control yoke) is greater than a predetermined value in the direction such as to cause the nose of the aircraft to pitch up. The necessary measurements are carried out with the aid of standard means (forming part of the information sources 4).

Optionally, to restrict the activity of the activation situation may be limited to the specific problematic issue of an engine out, and the means 5 and 13 can take into account other activation and inhibition conditions where information regarding engine fault detected or a thrust asymmetry measurement exceeding a certain value for authorizing activation is provided and/or for aircraft equipped with an apparatus for measuring or estimating aerodynamic sideslip, use of this information to inhibit activation in strong crosswinds, provided that the measured or estimated sideslip exceeds a certain value.

Figure 2:
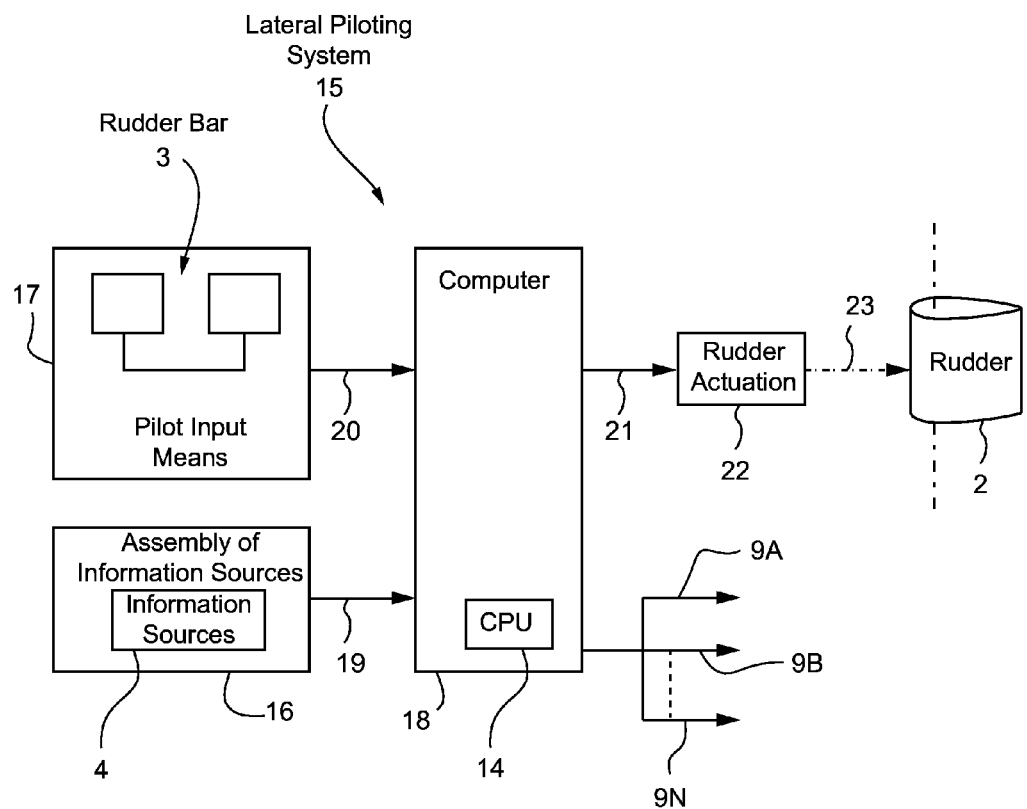
FIG. 2 is the schematic diagram of a system for lateral piloting of an aircraft comprising an apparatus in accordance with the invention.

In a preferred embodiment, the apparatus 1 is integrated into a lateral piloting system 15 of the aircraft, such as represented schematically in FIG. 2, which forms part of a system of electric flight controls.

In a standard manner, this lateral piloting system 15 comprises in particular: an assembly 16 of information sources, which comprises, in particular, means for measuring the current parameter values of the aircraft; means 17 for generating piloting directives, which comprise at least one rudder bar 3 which is able to be actuated by a pilot of the aircraft; a computer 18 which is connected by way of links 19 and 20 respectively to the sources assembly 16 and to the pilot input means 17 and which is formed so as to automatically produce, as a function of piloting directives received from the pilot input means 17, control commands which are intended to control the rudder 2; and a link 21 for applying, automatically, the control commands generated by the computer 18 to standard means of actuation 22 of the rudder 2, as illustrated by a chain-dotted arrow 23.

In this embodiment, in particular: the information sources 4 of the apparatus 1 can be integrated into the assembly 16 of the system 15 and the processing unit 14 can be integrated into the computer 18. In a standard manner, when the rolling speed of the aircraft exceeds a predetermined value, generally 40 knots, the pilot uses the rudder bar 3 to generate the piloting directive and provide yaw control by means of the rudder.

In this application, when the pilot actuates the rudder bar 3, the computer 18 orders the deflection of the rudder 2, and also the symmetric deflection of the spoilers 11A to 11N in accordance with the invention (if the activation conditions are fulfilled). Thus, for one and the same aerodynamic load generated by the deflection of the rudder 2, the lateral load generated by the reaction of the ground is increased, thus affording the pilot greater authority of lateral and directional control of the aircraft.

In view of the above disclosure, many different embodiments and variations on the basic invention described herein will be obvious to those of ordinary skill in the art. Accordingly, the scope of the present invention is limited only by the claims appended hereto.

The invention claimed is:

1. A method of improving lateral and directional control of an aircraft rolling on a runway of an airport during a takeoff phase, wherein the aircraft is equipped with a plurality of spoilers, said aircraft is controlled laterally on the ground at least by a rudder which is controlled by pilot input, said method comprising:
   automatically monitoring to detect an activation situation while the aircraft is on the ground and during a takeoff run, wherein the activation situation includes at least one of an engine failure or actuation of a rudder control to deflect a rudder of the aircraft;
   automatically producing at least one control command, in response to the monitoring detecting the activation situation, to at least partially actuate said spoilers in a symmetric manner; and
   at least partially activating automatically, in response to the at least one said control command, at least two of said spoilers symmetrically to reduce lift of the aircraft and improve lateral and directional control of the aircraft on the ground.

2. The method according to claim 1, wherein said partial activation generates a symmetric deflection of the at least two of said spoilers at a predetermined rate and angle of deflection.

3. The method according to claim 2, further comprising verifying that the aircraft is on the ground by monitoring at least one of the following:
depression of landing gear of the aircraft;
rate of rotation of at least one landing gear wheel; and
measuring height above the runway using a radio altimeter.

4. The method according to claim 2, further comprising verifying the aircraft is performing a takeoff by monitoring at least one of the following:
position of engine thrust control members;
indication of spoiler function activation; and
aircraft speed.

5. The method according to claim 1, further comprising verifying that the aircraft by monitoring for at least one of the following:
depression of landing gear of the aircraft;
a rate of rotation of at least one landing gear wheel; and
measuring a height of the aircraft above the runway using a radio altimeter.

6. The method according to claim 5, further comprising verifying the aircraft is performing a takeoff by monitoring at least one of the following:
position of engine thrust control members;
indication of spoiler function activation; and
aircraft speed.

7. The method according to claim 5, wherein the activation situation is defined by a need to increase lateral controllability of the aircraft.

8. The method according to claim 5, further including moving the spoilers to an inactivated position in response to rotation by the aircraft during takeoff.

9. The method according to claim 1, further comprising verifying that the aircraft is on a takeoff run by monitoring for at least one of the following:
position of engine thrust control members;
indication of spoiler function activation; and
aircraft speed.

10. The method according to claim 9, the activation situation is defined by a need to increase lateral controllability of the aircraft.

11. The method according to claim 9, further including moving the spoilers to an inactivated position in response to rotation by the aircraft during takeoff.

12. The method according to claim 1, wherein the activation situation is defined as a need to increase lateral controllability of the aircraft.

13. The method according to claim 1, further including inhibiting the activating step when the aircraft commences a rotation on takeoff and thereafter returning the spoilers to an inactivated position.

14. An apparatus for improving the lateral and directional control of an aircraft rolling on a runway of an airport during a takeoff phase, the apparatus comprising:
a plurality of spoilers arranged on the aircraft symmetrically about a longitudinal axis of the aircraft;
a rudder on the aircraft configured to control the aircraft laterally on the ground as a result of pilot input, and
a controller on the aircraft, wherein the controller:
monitors the aircraft to detect an activation situation while the aircraft is on the ground and during takeoff of the aircraft, wherein the activation situation includes at least one of an engine failure or actuation of a rudder control to deflect a rudder of the aircraft;
in response to the detection of the activation situation, automatically generates a control command to at least partially actuate said spoilers in a symmetric manner; and
in response to said control command, automatically and symmetrically actuates at least two of said spoilers to reduce lift of the aircraft.

15. The apparatus according to claim 14, wherein said control command indicates a predetermined angle of deflection of the spoilers and the response to the control command includes actuating the at least two of said spoilers to the angle of deflection.

16. The apparatus according to claim 15, wherein the controller is further configured to automatically return the spoilers to a stowed position in response to the aircraft commencing rotation on takeoff.

17. The apparatus according to claim 14, wherein the controller causes the spoilers to be returned to a stowed position in response to the aircraft commencing rotation during takeoff.

18. A system for lateral piloting of an aircraft comprising:
at least one rudder controlled as a function of piloting directives; and
the apparatus in accordance with claim 14.

19. A system of electronic flight controls of an aircraft, said aircraft including the apparatus in accordance with claim 14.

20. An aircraft, said aircraft including the apparatus according to claim 14.

21. An apparatus for improving the lateral and directional control of an aircraft rolling on a runway of an airport during a takeoff phase, the apparatus comprising:
a plurality of spoilers arranged on the aircraft symmetrically about a longitudinal axis of the aircraft;
a rudder on the aircraft which controls lateral movement of the aircraft on the ground as a result of pilot input; a monitor circuit which monitors the aircraft and detects an activation situation while the aircraft is on the ground and is carrying out a takeoff run, wherein the activation situation includes at least one of an engine failure or actuation of a rudder control to deflect the rudder of the aircraft;
a first circuit which responds to the detection of an activation situation by the monitor circuit by generating a control command which indicates an actuation of at least two of the spoilers in a symmetric manner; and
a second circuit which responds to the control command by automatically and symmetrically actuating at least two of the spoilers to reduce the lift of the aircraft and improve lateral and directional control on the ground.

22. A method comprising:
monitoring an aircraft during takeoff to detect at least one of an engine failure occurring before the aircraft lifts from ground and a control input by a pilot to move a rudder of the aircraft;
in response to the detection of the engine failure or the control input, automatically actuating spoilers on aerodynamic lifting surfaces of the aircraft, wherein the spoilers are arranged symmetrically with respect to a longitudinal axis of the aircraft and the actuation causes the spoilers to move symmetrically;
reducing aerodynamic lift forces applied to the aerodynamic lifting surfaces by the symmetrical movement of the spoilers, and
exploiting the reduced aerodynamic lift forces to enhance lateral and directional control of the aircraft on the ground.

23. The method of claim 22 wherein the spoilers are stowed during takeoff, before the deployment of the spoilers.

24. The method of claim 22 further comprising stowing the spoilers after the deployment and in response to the aircraft rotating on takeoff.

\* \* \* \* \*